Patented Nov. 1, 1938

2,135,433

UNITED STATES PATENT OFFICE 2,135,433

AZO DYESTUFFS

Detlef Delfs, Leverkusen, Helmut Kleiner, Cologne-Muhlheim, and Theodor Kollmann, Leverkusen, Germany, assignors to General Aniline Works, Inc., New York, N. Y., a corporation of Delaware No Drawing. Application September 16, 1936, Serial No. 101,078. In Germany October 26, 1935

20 Claims. (Cl. 8—42)

The present invention relates to water insoluble azodyestuffs and to printing preparations suitable for the manufacture of the said dyestuffs by a printing process, more particularly our invention relates to water-insoluble azodyestuffs which may be represented by the general formula:

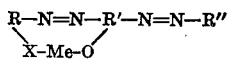

In the said formula R stands for an aromatic radical which may bear further azo groups, for example for the radical of the benzene series, of the naphthalene series, of the diphenyl series and the like, R' stands for a radical of the benzene series capable of coupling twice, which is substituted in a position meta to O by a hydroxy group. R'' stands for the radical of a diazotized aromatic amine of the kind generally used in the manufacture of ice colors, X stands for an oxygen atom or the group COO, Me stands for a metallic atom, capable of yielding azodyestuff complex compounds and wherein the bridge X—Me—O is attached to the nuclei in positions ortho to the azo bridge, it being selfunderstood that groups inducing solubility in water, such as the sulfonic acid group and the carboxylic acid group, are excluded as substituents.

The process of manufacture of the dyestuffs according to the invention is by coupling, especially on the fiber, metal complex compounds of the azodyestuffs from resorcinol or its homologues, capable of coupling twice, and ortho-hydroxy- or ortho-carboxydiazo compounds, the azodyestuffs containing no further solubilizing groups, with diazo compounds suitable for the manufacture of ice colors. The process may be effected in the manner generally used in the manufacture of ice colors by impregnating the fiber with the azodyestuffs containing metal referred to above and further developing the dyeing with suitable diazo compounds.

A particular method of effecting the process is by bringing the said coupling component on the fiber together with an arylnitrosamine suitable for the manufacture of ice colors (compare U. S. Patent 1,915,734) or a suitable aryldiazo-amino- or -imino-compound soluble in water or an alkaline medium, as obtainable by the condensation of diazo compounds with primary aliphatic or aromatic, secondary aliphatic, aromatic or heterocyclic bases or cyanamide or cyanamide carboxylic acid (compare U. S. Patents 1,858,623; 1,874,524; 1,867,088; 1,871,850; 1,879,424; 1,882,-560; 1,882,562; 1,979,327; 1,982,681), and by developing the dyestuff in the customary manner, e. g. by hanging, steaming or treating with dilute acids or steam containing an acid. (Compare U. S. Patents 1,880,522; 1,882,556; 1,893,991; 2,035,518). In this manner in general brown shades of good fastness properties are obtained.

According to a further feature of the invention for producing the new waterinsoluble azodyestuffs by a printing process preparations consisting of the above-named azodyestuffs and arylnitrosamines or aryldiazoamino-- or -imino-compounds, soluble in water or an alkaline medium, have proved particularly suited. (Compare U. S. Patents 1,882,561; 1,915,734).

The invention is illustrated by the following examples:

Example 1

A cotton tissue is printed with a printing color, containing in 1000 grams:

28 grams of the diazoimino compound from diazotized 4-chloro-2-anisidine and sarcosine,
35 grams of the copper complex compound of the monoazodyestuff from 4-chloro-2-diazophenol and resorcinol,
30 grams of aqueous caustic soda lye 38° Bé.,
50 grams of glycolmonoethylether,
500 grams of a neutral starch tragacanth thickener, the remainder being water;

then the cotton is dried, steamed for five minutes in steam containing acetic acid and/or formic acid, rinsed, boiled, again rinsed and dried. A full dark brown is obtained.

The dyestuff corresponds to the following formula:

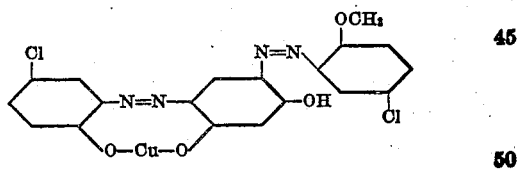

Example 2

A cotton tissue is printed with a printing color containing in 1000 grams:

43.6 grams of the diazoimino compound from diazotized 4-benzoylamino - 2.5-dimethoxy-1-aminobenzene and n-butylamino-acetic acid,
35 grams of the copper complex compound of the monoazodyestuff from 4-chloro-2-diazophenol and resorcinol,
30 grams of aqueous caustic soda lye 38° Bé.,
50 grams of glycolmonoethylether,
500 grams of a neutral starch tragacanth thickener, the remainder being water;

then the cotton is dried, steamed for five minutes in steam containing acetic acid and/or formic acid, rinsed, soaped, again rinsed and dried. A full blackish brown is thus obtained.

The dyestuff corresponds to the following formula:

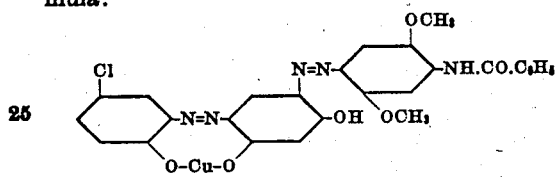

Example 3

5.4 grams of the sodium salt of the copper complex of the monoazodyestuff prepared from 4-chloro-2-diazophenol and resorcinol are dissolved in 10 ccm. of aqueous soda lye 38° Bé. and 10 ccm. of Turkey red oil, and diluted up to one liter with hot water. In this bath there are treated 50 grams of cotton yarn for half an hour at 30° C. The squeezed yarn is then introduced for half an hour into a developing bath of 10–15° prepared in the usual manner from 2.89 grams of aminoazotoluol by diazotizing, neutralizing the mineral acid with sodium acetate and filling up with water to 1 liter; then the yarn is rinsed and soaped in a boiling bath. A full reddish brown is thus obtained.

The dyestuff corresponds to the following formula:

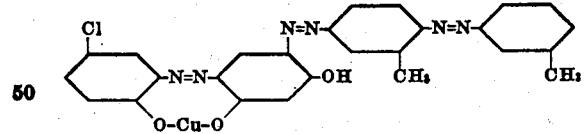

Example 4

A cotton tissue is printed with a printing color, containing in 1000 grams:

32.6 grams of the copper complex compound of the monoazodyestuff from 4-chloro-2-diazophenol and resorcinol,
35 grams of the nitrosamine from 4-chloro-2-anisidine (containing 52.2% base),
50 grams of glycolmonoethylether,
30 grams of aqueous caustic soda lye 38° Bé.,
50 grams of a neutral chromate solution and
500 grams of a neutral starch tragacanth thickener, the remainder being water;

then the cotton is dried, treated for 5 minutes with steam or steam containing acetic acid and/or formic acid vapours respectively, rinsed and soaped. A full dark brown is thus obtained. The dyestuff is identical with the dyestuff described in Example 1.

Example 5

If the nitrosamine from 4-chloro-2-anisidine, as described in Example 4, is substituted by 35.7 grams of the diazoimino compound from diazotized 4-chloro-2-anisidine and piperidine-3-sodium sulfonate, or 50.5 grams of the diazoimino compound from diazotized 1-amino-4-benzoylamino-2.5-diethoxybenzene and methyl-glucamine, or 37.7 grams of the diazoamino compound from diazotized 1-amino-2.5-dimethoxy-4'-nitro-azobenzene and cyanamidsodium, there are likewise obtained after treatment with steam containing vapours of acetic acid and/or formic acid full dark brown prints.

Example 6

A cotton tissue is printed with a printing color, containing in 1000 grams:

34 grams of the copper complex compound of the monoazodyestuff from 4-chloro-2-diazophenol and 1-methyl - 2.6 - dihydroxybenzene (cresorcinol),
37.8 grams of the diazoimino compound from diazotized 1-amino-4-benzoylamino-2-methoxy-5-methylbenzene and sarcosine sodium,
50 grams of glycolmonoethylether,
20 grams of aqueous caustic soda lye 38° Bé.,
500 grams of a neutral starch tragacanth thickener, the remainder being water;

then the cotton is dried, treated for 5 minutes with steam containing vapours of acetic and/or formic acid and finished in the usual manner. A full brown print is thus obtained somewhat more yellowish than the analogous print with the dyestuff from resorcinol.

The dyestuff corresponds to the following formula:

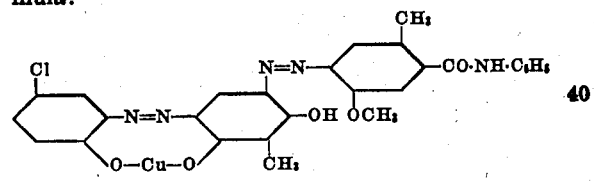

Example 7

With a printing paste containing in 1000 grams:

32 grams of the copper complex compound of the monoazo-dyestuff from anthranilic acid and resorcinol,
42.2 grams of the diazoimino compound from diazotized 1 - amino-2.5-diethoxy-4-benzoylamino-benzene and sarcosine sodium,
50 grams of glycolmonoethylether,
20 grams of aqueous caustic soda lye 38° Bé.,
500 grams of neutral starch tragacanth thickener, the remainder being water, cotton tissue is printed, dried, treated for 5 minutes with steam or steam containing vapours of acetic and/or formic acid and finished in the usual manner. There is obtained a full dark brown with good fastness properties.

The dyestuff corresponds to the following formula:

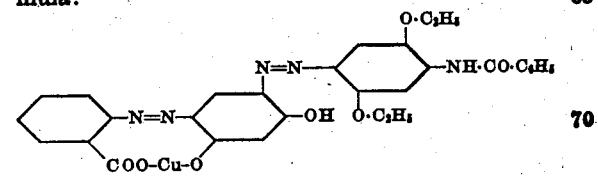

In the following table there are given further combinations prepared in accordance with the invention.

| Coupling component | Diazotization component | Shade |
|---|---|---|
| 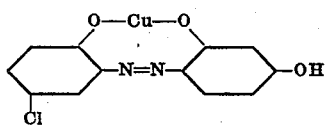 | 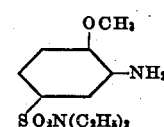 | Reddish brown. |
| Do | 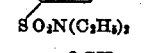 | Yellowish brown. |
| Do | 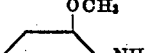 | Reddish brown. |
| Do | 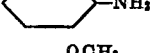 | Subdued brown. |
| 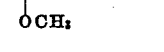 | 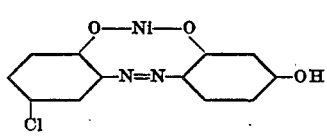 | Dark blackish brown. |
| Do |  | Do. |
| Do | 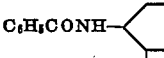 | Full reddish brown. |
| Do |  | Do. |
| Do |  | Yellowish brown. |
| Do |  | Do. |
|  | 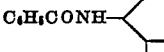 | Rich subdued brown. |
| Do |  | Do. |
|  |  | Full dark brown. |
| Do | 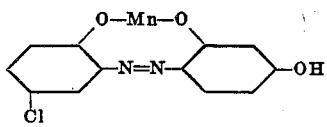 | Reddish brown. |

| Coupling component | Diazotization component | Shade |
|---|---|---|
| [structure: Co-complex azo, chloro-substituted phenol coupled with chlorohydroxyphenyl] | [2-methoxy-4-chloroaniline] | Reddish brown. |
| Do. | [2,4-dichloroaniline] | Do. |
| [structure: Cu-complex azo with NO₂ substituent] | [2-methoxy-4-chloroaniline] | Reddish strong brown. |
| Do. | [2,5-diethoxyaniline] | Do. |
| Do. | [C₆H₅CONH-, Cl, OCH₃ substituted aniline] | Blackish brown. |
| [structure: Cu-complex azo with OCH₃ substituent] | [C₆H₅CONH-, OC₂H₅, OC₂H₅ substituted aniline] | Do. |
| Do. | [C₆H₅CONH-, Cl, OCH₃ substituted aniline] | Violetish brown. |
| Do. | [OCH₃, SO₂N(C₂H₅)₂ substituted aniline] | Reddish brown. |
| Do. | [2,5-dimethoxyaniline] | Do. |
| Do. | [o-anisidine] | Yellowish brown. |
| [structure: Cu-complex azo with CH₃, Cl substituents] | [C₆H₅CONH-, OC₂H₅, OC₂H₅ substituted aniline] | Shades similar to those which are obtained with the first coupling component indicated above. |
| Do. | [OCH₃, Cl substituted aniline] | |
| Do. | [OCH₃, SO₂N(C₂H₅)₂ substituted aniline] | |

| Coupling component | Diazotization component | Shade |
|---|---|---|
| 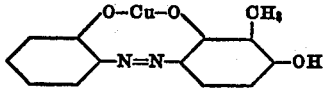 | 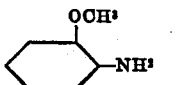 | Shades similar to those which are obtained with the first coupling component indicated above. |
| Do | 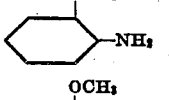 | |
| 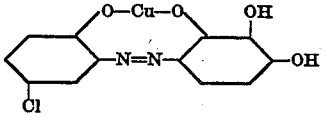 | 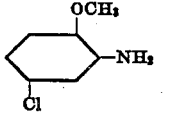 | Violetish brown. |
| 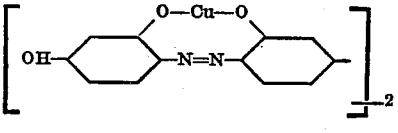 | 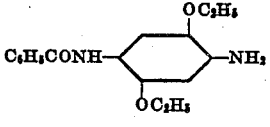 | Bluish black. |
| Do | 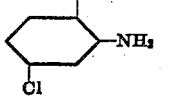 | Blackish brown. |
| Do | 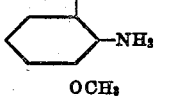 | Deep brown. |
| Do | 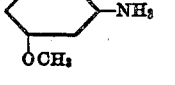 | Do. |
| 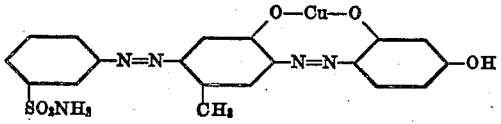 | 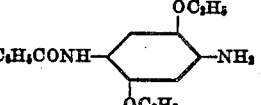 | Violetish blackish brown. |
| Do | 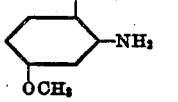 | Subdued dark brown. |
| Do | 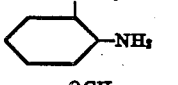 | Dark brown. |
| 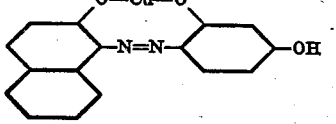 | 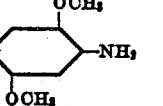 | Violetish brown. |
| Do | 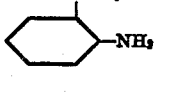 | Do. |
| Do | 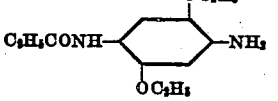 | Blackish brown. |

We claim:
1. Water insoluble azodyestuffs of the general formula:

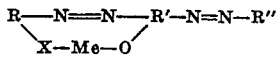

wherein R stands for an aromatic radical, R' stands for a radical of the benzene series capable of coupling twice, which is substituted in a position meta to O by a hydroxy group, R" stands for the radical of a diazotized aromatic amine generally used in the manufacture of ice colors, X stands for a member selected from the group consisting of an oxygen atom and the group COO, Me stands for a metallic atom capable of yielding azodyestuff complex compounds, and wherein the bridge X—Me—O is attached to the nuclei in positions ortho to the azo bridge, yielding when produced on the fiber in general brown shades of good fastness properties.

2. Water insoluble azodyestuffs of the general formula:

$$R-N=N-R'-N=N-R''$$
$$\diagdown X-Cu-O \diagup$$

wherein R stands for an aromatic radical, R' stands for a radical of the benzene series capable of coupling twice, which is substituted in a position meta to O by a hydroxy group, R'' stands for the radical of a diazotized aromatic amine generally used in the manufacture of ice colors, X stands for a member selected from the group consisting of an oxygen atom and the group COO, yielding when produced on the fiber in general brown shades of good fastness properties.

3. Water insoluble azodyestuffs of the general formula:

$$R-N=N-\bigcirc\begin{array}{c}N=N-R''\\-OH\end{array}$$
$$\diagdown O-Cu-O \diagup$$

wherein R and R'' stand for benzene radicals, and wherein the bridge O—Cu—O is attached to the nuclei in positions ortho to the azo bridge, yielding when produced on the fiber in general brown shades of good fastness properties.

4. Water insoluble azodyestuffs of the general formula:

$$X-\bigcirc-N=N-\bigcirc\begin{array}{c}N=N-R''\\-OH\end{array}$$
$$\diagdown O-Cu-O \diagup$$

wherein X stands for a member selected from the group consisting of hydrogen, halogen, the nitro group and an alkyl group, R'' stands for a radical of the benzene series, yielding when produced on the fiber in general brown shades of good fastness properties.

5. Water insoluble azodyestuffs of the general formula:

$$X-\bigcirc-N=N-\bigcirc-N=N-\bigcirc\begin{array}{c}\text{alkoxy}\\-OH\ Y\end{array}$$
$$\diagdown O-Cu-O \diagup$$

wherein X stands for a member selected from the group consisting of hydrogen, halogen, the nitro group and an alkyl group, Y stands for a member selected from the group consisting of hydrogen, halogen, alkoxy and alkyl, yielding when produced on the fiber in general brown shades of good fastness properties.

6. The water insoluble azodyestuff of the formula:

$$Cl-\bigcirc-N=N-\bigcirc-N=N-\bigcirc\begin{array}{c}OCH_3\\-OH\ Cl\end{array}$$
$$\diagdown O-Cu-O \diagup$$

yielding when produced on the fiber a full dark brown.

7. Water insoluble azodyestuffs of the general formula:

$$X-\bigcirc-N=N-\bigcirc-N=N-\bigcirc\begin{array}{c}\text{alkoxy}\\-NH.CO.C_6H_5\\-OH\ Y\end{array}$$
$$\diagdown O-Cu-O \diagup$$

wherein X stands for a member selected from the group consisting of hydrogen, halogen, the nitro group and an alkyl group, Y stands for a member selected from the group consisting of alkoxy and alkyl, yielding when produced on the fiber in general brown shades of good fastness properties.

8. The water insoluble azodyestuff of the formula:

$$Cl-\bigcirc-N=N-\bigcirc-N=N-\bigcirc\begin{array}{c}OCH_3\\-NH.CO.C_6H_5\\-OH\ OCH_3\end{array}$$
$$\diagdown O-Cu-O \diagup$$

yielding when produced on the fiber a full blackish brown.

9. Fibers dyed with a dyestuff as claimed in claim 1.
10. Fibers dyed with a dyestuff as claimed in claim 2.
11. Fibers dyed with a dyestuff as claimed in claim 3.
12. Fibers dyed with a dyestuff as claimed in claim 4.
13. Fibers dyed with a dyestuff as claimed in claim 5.
14. Fibers dyed with a dyestuff as claimed in claim 6.
15. Fibers dyed with a dyestuff as claimed in claim 7.
16. Fibers dyed with a dyestuff as claimed in claim 8.
17. Printing preparations comprising a dyestuff of the following formula:

$$R-N=N-R'$$
$$\diagdown X-Me-O \diagup$$

wherein R stands for an aromatic radical, R' stands for a radical of the benzene series capable of coupling twice, which is substituted in a position meta to O by a hydroxy group, X stands for a member selected from the group consisting of an oxygen atom and the group COO, Me stands for a metallic atom capable of yielding azodyestuff complex compounds, and wherein the bridge X—Me—O is attached to the nuclei in positions ortho to the azo bridge, and a compound selected from the group consisting of nitrosamines, diazo-amino- and diazo-imino compounds derived from aromatic amines generally used in the manufacture of ice colors.

18. Printing preparations comprising a dyestuff of the following formula:

$$R-N=N-\bigcirc-OH$$
$$\diagdown O-Cu-O \diagup$$

wherein R means a radical of the benzene series, and wherein the bridge O—Cu—O is attached to the benzene nuclei in positions ortho to the azo bridge, and a compound selected from the group consisting of nitrosamines, diazo-amino- and diazo-imino compounds derived from aromatic amines generally used in the manufacture of ice colors.

19. Printing preparations comprising a compound of the general formula:

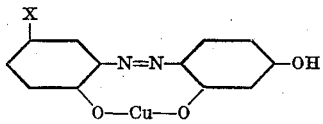

wherein X stands for a member selected from the group consisting of hydrogen, halogen, the nitro group and an alkyl group, and a compound selected from the group consisting of nitrosamines, diazo-amino- and diazo-imino compounds derived from an amine of the following general formula:

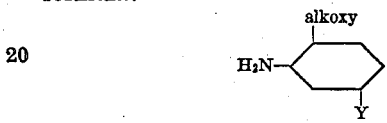

wherein Y stands for a member selected from the group consisting of hydrogen, halogen, alkoxy and alkyl.

20. Printing preparations comprising a compound of the general formula:

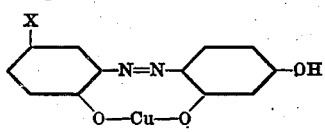

wherein X stands for a member selected from the group consisting of hydrogen, halogen, the nitro group and an alkyl group, and a compound selected from the group consisting of nitrosamines, diazo-amino- and diazo-imino compounds derived from an amine of the following general formula:

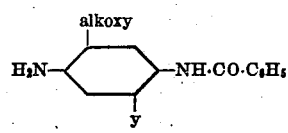

wherein Y stands for a member selected from the group consisting of alkoxy and alkyl.

DETLEF DELFS.
HELMUT KLEINER.
THEODOR KOLLMANN.